United States Patent
Adachi et al.

(10) Patent No.: US 12,110,010 B2
(45) Date of Patent: Oct. 8, 2024

(54) DRIVING ASSISTANCE DEVICE

(71) Applicant: Mitsubishi Electric Corporation, Tokyo (JP)

(72) Inventors: Yoshiaki Adachi, Tokyo (JP); Yuji Hamada, Tokyo (JP); Takayoshi Takehara, Tokyo (JP); Masahiko Ikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 455 days.

(21) Appl. No.: 17/040,054

(22) PCT Filed: Apr. 13, 2018

(86) PCT No.: PCT/JP2018/015475
§ 371 (c)(1),
(2) Date: Sep. 22, 2020

(87) PCT Pub. No.: WO2019/198223
PCT Pub. Date: Oct. 17, 2019

(65) Prior Publication Data
US 2021/0024060 A1    Jan. 28, 2021

(51) Int. Cl.
*B60W 30/09*  (2012.01)
*B60W 30/095* (2012.01)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 2520/105;
(Continued)

(56) References Cited

U.S. PATENT DOCUMENTS

2006/0055525 A1*  3/2006  Kubota .................. G08G 1/167
                                                340/425.5
2006/0167620 A1*  7/2006  Takagi .................. G08G 1/161
                                                701/519
(Continued)

FOREIGN PATENT DOCUMENTS

JP        2010-165021 A   7/2010
JP        2011-053799 A   3/2011
(Continued)

OTHER PUBLICATIONS

Hidetsugu et al. JP2015-203922A English Translated Abstract and Figure 2 Espacenet (Year: 2015).*

(Continued)

*Primary Examiner* — Dale W Hilgendorf
*Assistant Examiner* — Frank T Glenn, III
(74) *Attorney, Agent, or Firm* — XSENSUS LLP

(57) ABSTRACT

A driving assistance device includes processing circuitry to acquire host vehicle information, receive mobile object information from a mobile object outside the host vehicle using wireless communication, determinate a right or left turn of the host vehicle based on the host vehicle information, obtain a prediction point by calculating a right or left turn point of the host vehicle based on the host vehicle information, determine whether or not the host vehicle collides with the mobile object using the host vehicle information, the mobile object information, and the prediction point, and perform driving assistance of the host vehicle based on a result of the collision determination. The processing circuitry obtains the prediction point by calculating, on a basis of a preset deceleration, a distance required for the speed of the host vehicle HV included in the host vehicle information to reach a target speed set in advance.

12 Claims, 10 Drawing Sheets

(52) U.S. Cl.
CPC ... *B60W 2520/105* (2013.01); *B60W 2540/20* (2013.01); *B60W 2554/402* (2020.02)

(58) Field of Classification Search
CPC ....... B60W 2540/20; B60W 2554/402; B60W 30/18145; B60W 2554/4029; B60W 2556/45; G08G 1/09; G08G 1/16
See application file for complete search history.

(56) References Cited

U.S. PATENT DOCUMENTS

| | | | | |
|---|---|---|---|---|
| 2011/0153166 | A1* | 6/2011 | Yester | B60W 30/09 701/45 |
| 2014/0058579 | A1* | 2/2014 | Ono | B60W 50/0097 701/1 |
| 2016/0311442 | A1* | 10/2016 | Shin | B60W 30/18145 |
| 2017/0061798 | A1* | 3/2017 | Linder | G08G 1/096725 |
| 2017/0072852 | A1* | 3/2017 | Matsuoka | G08G 1/164 |
| 2017/0220041 | A1* | 8/2017 | Tanaka | G08G 5/0086 |
| 2018/0118189 | A1* | 5/2018 | Payne | B60L 7/18 |
| 2018/0178802 | A1* | 6/2018 | Miyata | B60W 30/095 |
| 2019/0179019 | A1 | 6/2019 | Niimura | |

FOREIGN PATENT DOCUMENTS

| | | | | |
|---|---|---|---|---|
| JP | 2013199241 | A | * 10/2013 | ............ B60W 30/18 |
| JP | 2013-254296 | A | 12/2013 | |
| JP | 2015-203922 | A | 11/2015 | |
| JP | 2016-062328 | A | 4/2016 | |
| JP | 2016103199 | A | * 6/2016 | |
| JP | 2018-025449 | A | 2/2018 | |
| WO | 2015/156209 | A1 | 10/2015 | |
| WO | 2018/030420 | A1 | 2/2018 | |

OTHER PUBLICATIONS

Fukumoto JP2013-199241A English Translated Description Global Dossier (Year: 2013).*

Chinese Office Action issued Feb. 25, 2022, in Chinese Application No. 201880091994.9.

International Search Report and Written Opinion mailed on Jun. 26, 2018, 2018 for PCT/JP2018/015475 filed on Apr. 13, 2018, 10 pages including English Translation of the International Search Report.

* cited by examiner

DRIVING ASSISTANCE DEVICE

CROSS-REFERENCE TO RELATED APPLICATION

The present application is based on PCT filing PCT/JP2018/015475, filed Apr. 13, 2018, the entire contents of which are incorporated herein by reference.

TECHNICAL FIELD

The disclosure relates to a driving assistance device to perform driving assistance of a vehicle.

BACKGROUND ART

A driving assistance device exchanges information such as position, speed, acceleration, and direction with the mobile object around the host vehicle, and recognizes the surrounding environment based on the running state of the host vehicle and the positional relation between the host vehicle and the mobile object, thereby providing drivers with various driving assistance for the purpose of improving safety and comfort. In such a driving assistance device, a driving assistance function has been particularly proposed in recent years for avoiding a collision with a mobile object whose traveling route intersects with that of the host vehicle when the vehicle turns right or left.

For example, a driving assistance device described in Patent Document 1 discloses a technique of predicting, at an intersection on a road, arrival times of a vehicle and another mobile object entering the intersection to determine a collision.

The driving assistance device described in Patent Document 2 discloses a technique of determining whether a host vehicle waits for a right turn or left turn to determine a collision with another mobile object.

PRIOR ART DOCUMENT

Patent Document

Patent Document 1 Unexamined Patent Application Publication JP, 2010-165021
Patent Document 2 Unexamined Patent Application Publication JP, 2013-254296

SUMMARY OF INVENTION

Technical Problem

The technique described in Patent Document 1, however, uses road map information including intersection information. Thus, when a vehicle makes a right or left turn at a place on a road that is not an intersection, or at an intersection whose intersection information is not included in the road map information, a collision with the mobile object cannot be correctly determined, unfortunately.

In the technique described in Patent Document 2, because the state of waiting for the right turn or left turn of the host vehicle is determined and the arrival time of another vehicle at the stop position of the host vehicle is determined, the collision with the mobile object is not correctly determined if the host vehicle is running.

This disclosure is made to solve the above problems. That is, even in a place that is not an intersection, or in an intersection whose intersection information is not included in road map information, by determining a right or left turn from a behavior of the host vehicle, and by predicting the right turn point or left turn point of the host vehicle, the mobile object that is really in danger of collision is determined in advance. An object is thereby to reduce unnecessary driving assistance and omission of necessary driving assistance.

Solution to Problem

In order to solve the problems mentioned above and achieve the object, the driving assistance device according to the present disclosure comprises: a host vehicle information acquisition means to acquire host vehicle information that is vehicle information of a host vehicle; an external device communication means to receive mobile object information from a mobile object outside the host vehicle using wireless communication; a right/left turn determination means to determinate a right turn or left turn of the host vehicle on the basis of the host vehicle information acquired by the host vehicle information acquisition means; a right/left turn point prediction means to obtain a prediction point by calculating a right turn or left turn point of the host vehicle on the basis of the host vehicle information; a collision determination means to determine whether or not the host vehicle collides with the mobile object using the host vehicle information, the mobile object information received by the external device communication means, and the prediction point obtained by the right/left turn point prediction means; and a driving assistance means to perform driving assistance of the host vehicle on the basis of a result of the collision determination determined by the collision determination means, wherein the right/left turn point prediction means obtains the prediction point by calculating, on a basis of a preset deceleration, a distance required for the speed of the host vehicle HV included in the host vehicle information to reach a target speed set in advance.

Advantageous Effects of Invention

According to the disclosure, by determining the right or left turn of the host vehicle, and by predicting the right or left turn point of the host vehicle, the driving assistance regarding the right/left turn can be performed without using the road map information including intersection positions. In addition, by predicting the right or left turn point of the host vehicle, a correct collision determination can be performed even for a distant mobile object that was conventionally determined that it has no possibility of collision; this enables providing driving assistance to the driver in advance. Thus, unnecessary driving assistance and omission of necessary driving assistance can be reduced.

DESCRIPTION OF EMBODIMENTS

Figure 1:
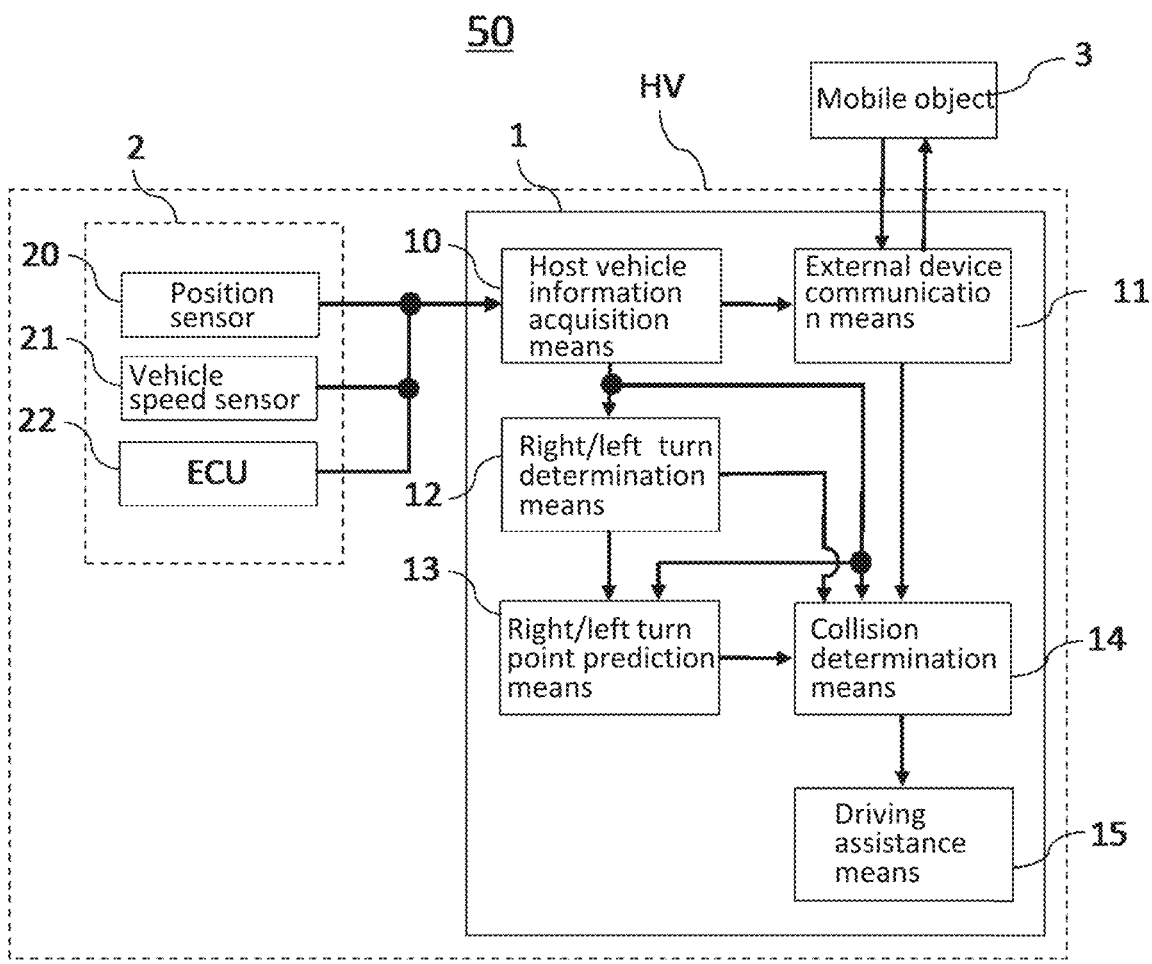
FIG. 1 is a block diagram showing a configuration of a driving assistance device according to Embodiment 1 of the disclosure.

Embodiments of a driving assistance device according to the present disclosure will be described in detail referring to the drawings.

The embodiments described below are mere examples, and the disclosure is not limited by the following embodiments.

Embodiment 1

In Embodiment 1, a case will be described in which the driving assistance device is assumed to be mainly an in-vehicle device, and provides services as a driving assistance device of a driving assistance system.

FIG. 1 is a block diagram showing a configuration of a driving assistance device 1 according to Embodiment 1 of the present disclosure.

In FIG. 1, the driving assistance system 50 is a system in which the driving assistance device 1 provides driving assistance to a driver by exchanging position information, speed information, and the like with an around-host-vehicle mobile object 3, which is a mobile object around the host vehicle HV, using wireless communication. The driving assistance system 50 includes the driving assistance device 1, in-vehicle sensor equipment 2, and the around-host-vehicle mobile object 3. In FIG. 1, the around-host-vehicle mobile object 3 is simply represented as "Mobile object 3".

In the following description, similarly, the around-host-vehicle mobile object 3 may be simply referred to as "mobile object 3". The around-host-vehicle mobile object 3 (mobile object 3) is a mobile object outside the host vehicle HV.

Here, for the wireless communication, a short range communication DSRC (Dedicated Short Range Communication) may be used, or a communication system used in a wireless local area network (LAN) or a mobile phone may be used. Further, for the wireless communication, a communication system to be used in IEEE 802.11p or communication access for land mobiles (CALMS), which are being studied in Europe and the United States, may be used.

The in-vehicle sensor equipment 2 includes one or more sensor devices equipped for the host vehicle HV to generate vehicle information indicating a vehicle states and a running states of the host vehicle HV. The in-vehicle sensor equipment 2 includes, for example, a position sensor 20 such as a global navigation satellite system (GNSS) for acquiring the position of the host vehicle HV, a vehicle speed sensor 21 for acquiring the vehicle speed from a vehicle speed pulse, a position change, etc., an electronic control unit (ECU) 22 for acquiring an acceleration, a direction, a blinker state, a brake state, an accelerator state, the engine state, or the like.

Note that the in-vehicle sensor equipment 2 may be installed in the driving assistance device 1, or may be connected to the driving assistance device 1 directly or via an in-vehicle network.

Further, for the in-vehicle network, a controller area network (CAN), which is generally used for in-vehicle communication, may be used, or FlexRay or Ethernet (registered trademark), which is capable of high-speed communication, may be used.

In the following description, the vehicle information of the host vehicle HV generated by the in-vehicle sensor equipment 2 is referred to as "host vehicle information". The host vehicle information includes, for example, a position, a speed, an acceleration, a direction, a steering angle, a yaw rate, a brake state, a blinker state, a weight, and a vehicle length.

The around-host-vehicle mobile object 3 is a mobile object existing around the host vehicle HV or moving around the host vehicle HV, such as an automobile, a motorcycle, a personal transporter, a pedestrian, a drone, and a robot.

The area around the host vehicle HV refers to reach of wireless communications or a distribution area of mobile object information set by the wireless communication system. For example, when IEEE802.11p is used, the reach of wireless communications is about 1 km, so the area around the host vehicle is an area within 1 km from the host vehicle. Because the reach of wireless communications varies depending on the communication environment, an error due to such variation is included in actual operation.

The around-host-vehicle mobile object 3 generates, on the basis of sensor equipment (not illustrated) equipped for the around-host-vehicle mobile object 3 or a mobile device (not illustrated) held by the around-host-vehicle mobile object 3, object information and information indicating a moving state of the around-host-vehicle mobile object 3 and transmits the generated information using the wireless communication. The host vehicle HV receives the information directly from the around-host-vehicle mobile object 3 or indirectly using a repeater such as a roadside unit provided on a side of a road. A plurality of around-host-vehicle mobile objects 3 may exist around the host vehicle HV.

In the following description, information indicating the object state and moving state of the mobile object 3 transmitted by the around-host-vehicle mobile object 3 (mobile object 3) is referred to as "mobile object information". The mobile object information includes, for example, an identifier for uniquely specifying the mobile object 3, a position, a positioning state, a speed, an acceleration, a direction, size information. In addition, information specific to each mobile object 3 may be added. For example, when the mobile object 3 is a vehicle such as an automobile, a motorcycle, and personal transporter, vehicle-specific information such as a steering angle, a yaw rate, a brake state, and a blinker state may be added. Here, the yaw rate is a rotational angular velocity about a vertical axis of a vehicle such as an automobile and a motorcycle. When the mobile object 3 is a pedestrian, pedestrian-specific information such as a walking state and owner information acquired from a mobile terminal of the pedestrian may be added. When the mobile object 3 is an unmanned machine such as a drone or a robot, information unique to the unmanned machine such as an operation state may be added.

The driving assistance device 1 is an in-vehicle communication information processing device that receives mobile object information generated by the mobile object 3 through wireless communication, determines a collision between the host vehicle HV and the mobile object 3 by predicting a right/left turn point of the host vehicle HV, and provides driving assistance to a driver of the host vehicle HV. Here, the right/left turn point means a right turn point or a left turn point, that is, one of the right turn point and the left turn point. In the following, a right/left turn means a right turn or a left turn, that is, one of the right turn and the left turn.

As shown in FIG. 1, the driving assistance device 1 includes a host vehicle information acquisition means 10, an external device communication means 11, a right/left turn determination means 12, a right/left turn point prediction means 13, a collision determination means 14, and a driving assistance means 15.

In FIG. 1, solid arrows indicate flows of processing of driving assistance performed by the driving assistance device 1.

The host vehicle information acquisition means 10 is a processing unit that acquires host vehicle information generated by the in-vehicle sensor equipment 2 and provides the host vehicle information to the external device communication means 11, the right/left turn determination means 12, the right/left turn point prediction means 13, and the collision determination means 14.

The information acquired by the host vehicle information acquisition means 10 from the in-vehicle sensor equipment 2 may be a value directly outputted from the in-vehicle sensor equipment 2 or a value processed by some processing.

The external device communication means 11 is a processing unit that receives mobile object information generated by the mobile object 3 by wireless communication and provides the mobile object information to the collision determination means 14. The external device communication means 11 also performs processing for transmitting the host vehicle information generated by the host vehicle information acquisition means 10 to the mobile object 3.

The right/left turn determination means 12 is a processing unit that determines a right or left turn of the host vehicle HV on the basis of the host vehicle information acquired by the host vehicle information acquisition means 10, and provides the determination result to the right/left turn point prediction means 13 and the collision determination means 14.

Regarding a method of determining the right or left turn by the right/left turn determination means 12, determination of the right or left turn of the host vehicle HV is made on the basis of speed information, acceleration information, and blinker information included in the host vehicle information.

Specifically, the running state of the host vehicle HV is determined from the speed information and the acceleration information. For example, whether the vehicle is running or stopped is determined on the basis of the speed information, and whether the vehicle is decelerating is determined on the basis of the acceleration information. Note that "the vehicle is stopped" includes "the vehicle is running slowly", and "running slowly" includes "running very slowly". The very slow running means running at a speed that allows the vehicle to stop immediately. Although the case where the host vehicle HV is running very slowly includes a case where it is running at a speed of no more than 10 km/h, for example, the upper speed limit for determining whether the vehicle is running very slowly varies depending on the traffic conditions and is not limited to this.

Next, the right/left turn determination means 12 determines, on the basis of the determination result of the running state, whether the behavior of the host vehicle HV is for a right/left turn (right or left turn) or a lane change. If the running state is "stopped" or "running and decelerating", it determines that the behavior is for the right/left turn. On the other hand, if the running state is "running but not decelerating", it determines that the behavior is for the lane change.

Subsequently, when it determines that the behavior of the host vehicle HV is for the right/left turn, on the basis of the blinker information, it determines that the behavior is for the right turn when the right blinker is on, and the left turn when the left blinker is on. If the blinkers are off, it determines that the behaver is for others.

Note that the right/left turn determination means 12 does not have to determine the three types of right turn, left turn, and others (for example, going straight), and the number of determination types may be decreased or increased. The determination may be "a right turn or others", may be "a left turn or others", or may be "a right turn or going straight".

The running state may be determined by an instantaneous value, may be determined by a value calculated by processing with a filter such as a low-pass filter, or may be determined by time-series processing.

The right/left turn determination means 12 may perform determination on the basis of not only the speed information, the acceleration information and the blinker information, which is included in the host vehicle information, but also, for example, information explicitly inputted by the driver or route information of a navigation device, if equipped.

The right/left turn point prediction means 13 is a processing unit that predicts a point where the host vehicle turns right or left on the basis of the host vehicle information generated by the host vehicle information acquisition means 10 and the determination result of the right/left turn determined by the right/left turn determination means 12, and provides the prediction point to the collision determination means 14.

Regarding the prediction of the point where the host vehicle HV turns right or left, the prediction point is calculated using the speed information included in the host vehicle information. Specifically, the prediction point of right/left turn is obtained by calculating, on the basis of the preset deceleration, the distance required for the speed of the host vehicle HV to reach the preset target speed.

The preset deceleration and the preset target speed may be set at the time of manufacturing the driving assistance device 1, may be set by a driver, or may be set to values predicted by the driving support device 1 on the basis of past running histories.

The expression form of the prediction point may be any form that can represent the positional relation between the vehicle HV and the prediction point and the positional relation between the mobile object 3 and the prediction point. For example, it may be a relative distance based on the current position that represents the current position of the host vehicle HV, an arrival time based on the current time, or absolute coordinates such as latitude and longitude.

The preset target speed is for the case where it is considered that a right/left turn is made without stopping, and may be zero in the case where this is not considered. The preset decelerations for the right turn and left turn may be different values or the same value, and the preset target speeds for the right turn and left turn may be different values or the same value.

The collision determination means 14 uses the host vehicle information provided by the host vehicle information acquisition means 10, the mobile object information received by the external device communication means 11, the right/left turn determination result determined by the right/left turn determination means 12, and the right/left turn prediction point predicted by the right/left turn point prediction means 13. The collision determination means 14 is a processing unit that determines the possibility of collision between the host vehicle HV and the mobile object 3 on the basis of the above information, and provides the determination result to the driving assistance means 15.

Regarding the determination of the collision between the host HV and the mobile object 3, when the host vehicle HV turns right or left, if the traveling route of the host vehicle intersects with the traveling route of the mobile object 3, it is determined that there is a possibility of collision with the mobile object 3, and if not, there is no possibility of collision with the mobile object 3. Note that the possibility of collision may be determined by 2 values (either collision or no collision), may be determined by stepwise values, or may be determined by calculating occurrence probability of the event.

The determination of the collision between the host vehicle HV and the mobile object 3 is performed, using the prediction point calculated by the right/left turn point prediction means 13, on the basis of the geographical relation between the prediction point and the mobile object 3 or the geographical relation between the prediction point, the host vehicle HV and the mobile object 3. The collision determination method includes a method of determining that the mobile object 3 whose distance to the prediction point is within a certain distance has a possibility of collision, and a method of determining that the mobile object 3 approaching the prediction point has a possibility of collision. The collision determination method may be a method of calculating times for the HV and the mobile object 3 to arrive at the prediction point individually, and determining that there is a possibility of collision if the difference between the time of the HV's arrival and the time of the mobile object 3's arrival is equal to or less than a predetermined threshold. Regarding the collision determination method, one specific method may be used for any mobile objects 3, or different methods may be used for different mobile objects 3.

The driving assistance means 15 is a processing unit that provides driving assistance to a driver, regarding the mobile object 3 having a risk of collision, on the basis of the determination result determined by the collision determination means 14. For the driving assistance provided by the driving assistance means 15, human machine interface (HMI) equipment, such as an instrument panel, a speaker, and a vibrator, is used. Using the HMI equipment, the driver is warned of a collision with the mobile object 3 by screen display, sound output, vibration, and the like. Alternatively, the driving assistance means 15 performs driving assistance such as automatic braking and start prevention by controlling a braking device of the host vehicle HV driven by the driver.

The driving assistance means 15 may be executed on the driving assistance device 1, or may be executed on another device by the collision determination means 14's notifying, via the in-vehicle network, another in-vehicle device of the information about the mobile object 3 having a possibility of collision.

Each means of the driving assistance device 1 described above is realized by a central processing unit (CPU) of the driving assistance device 1 executing a program stored in a memory of the driving assistance device 1. Here, each means indicates the host vehicle information acquisition means 10, the external device communication means 11, the right/left turn determination means 12, the right/left turn point prediction means 13, the collision determination means 14, or the driving assistance means 15 in the driving assistance device 1 shown in FIG. 1, but is not limited thereto.

Next, the operation of the driving assistance device 1 according to the present embodiment will be described referring to FIG. 2.

Figure 2:
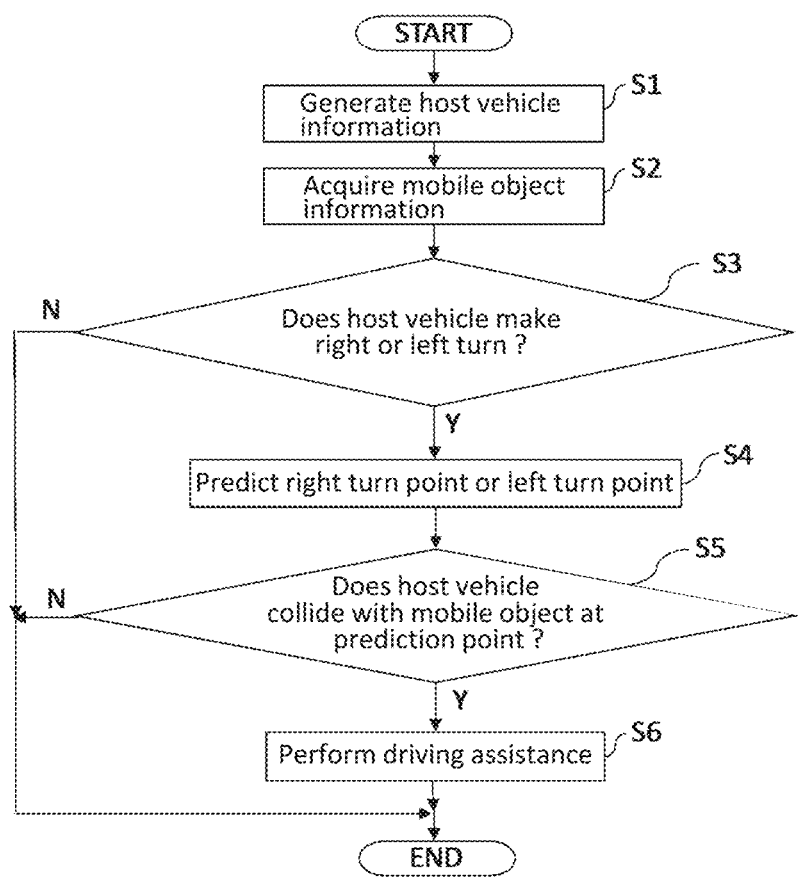
FIG. 2 is a flowchart showing an operation of the driving assistance device according to Embodiment 1 of the disclosure.

FIG. 2 is an example of a flowchart showing the operation of each means of the driving assistance device 1 according to Embodiment 1 of the disclosure.

The host vehicle information acquisition means 10 acquires information items that constitute the host vehicle information from the in-vehicle sensor equipment 2, and generates the host vehicle information (Step S1). After the host vehicle information acquisition means 10 generates the host vehicle information, the processing proceeds to Step S2.

In Step S2, the external device communication means 11 waits for reception of mobile object information from the mobile object 3. After the mobile object information is acquired from the mobile object 3 by reception, the processing proceeds to Step S3.

Step S1 and Step S2 may be performed in the opposite order or may be performed in parallel.

In Step S3, the right/left turn determination means 12 determines whether the host vehicle HV makes a right turn or a left turn (one of a right turn and a left turn) on the basis of the host vehicle information acquired in Step S1.

When the right/left turn determination means 12 determines that the behavior of the host vehicle HV is for a right turn or a left turn, the processing proceeds to Step S4. When the right/left turn determination means 12 determines that the behavior of the host vehicle HV indicates neither a right turn nor a left turn, the processing is terminated.

In Step S4, the right/left turn point prediction means 13 predicts a right turn point or a left turn point of the host vehicle HV on the basis of the host vehicle information acquired in Step S1.

After the right/left turn point prediction means 13 predicts the right turn point or the left turn point of the host vehicle HV, the processing proceeds to Step S5.

In Step S5, the collision determination means 14 determines whether the host vehicle HV collides with the mobile object 3 at the right turn point or the left turn point predicted by the right/left turn point prediction means 13.

If the collision determination means 14 determines that there is a possibility of collision between the host vehicle HV and the mobile object 3, the processing proceeds to Step S6. If the collision determining means 14 determines that there is no possibility of collision between the host vehicle HV and the mobile object 3, the processing is terminated.

In Step S6, the driving assistance means 15 starts driving assistance for the driver regarding the mobile object 3 determined by the collision determination means 14 that it has a possibility of collision. After performing the driving assistance, the processing is terminated.

The driving assistance device 1 repeatedly performs the above-described processing shown in FIG. 2 during its operation.

Next, a specific example of the operation of the driving assistance device 1 according to Embodiment 1 will be described referring to FIGS. 3 and 4.

Figure 3:
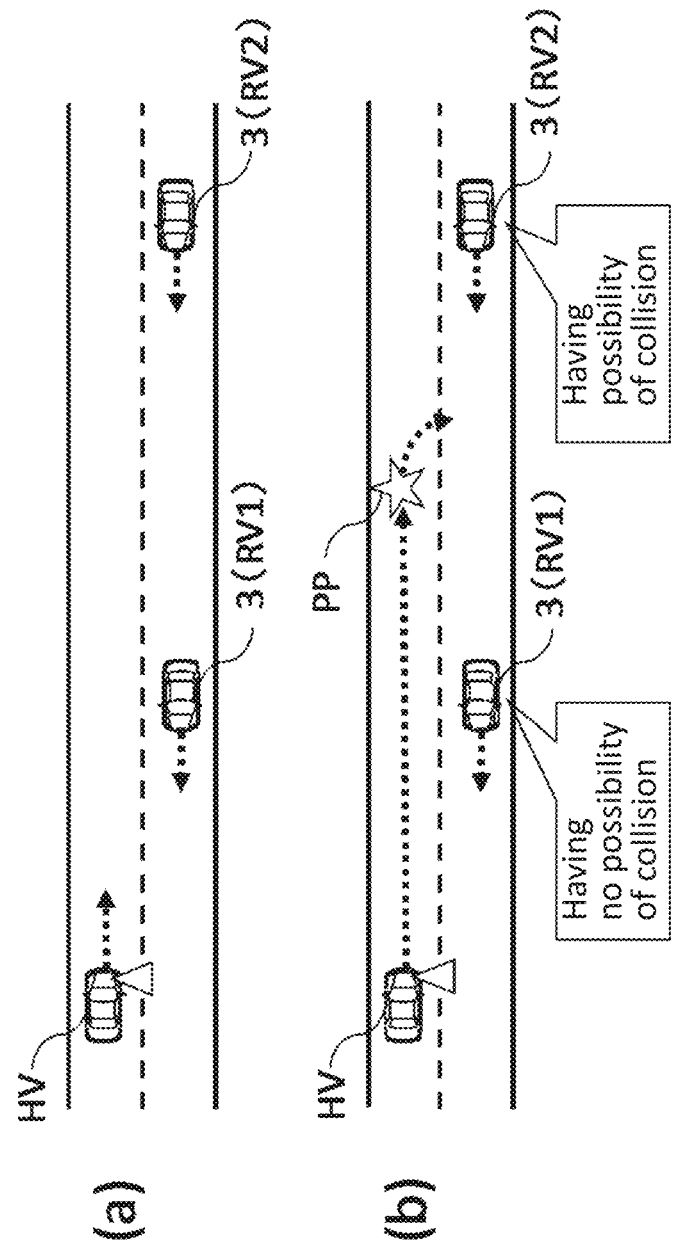
FIG. 3 is a diagram showing an example of the operation of the driving assistance device according to Embodiment 1 of the disclosure.

FIG. 3 is a diagram showing an example of the operation of the driving assistance device 1 according to Embodiment 1 of the disclosure. FIG. 3 shows a specific example of the operation of the driving assistance device that assists in avoiding a collision with an oncoming vehicle in regions where the vehicles run on the left side. FIGS. 3(a) and 3(b) both show the host vehicle HV running on the road and the mobile objects 3 (RV1, RV2) as a bird's-eye view from above.

FIGS. 3(a) and 3(b) show the host vehicle HV going straight on the road and then turning right across the oncoming lane, and oncoming vehicles RV1 and RV2, as two mobile objects 3, traveling on a road opposite to the road on which the host vehicle HV runs. Note that reference symbols of RV1 and RV2 are shown in parentheses in FIGS. 3(a) and 3(b). Hereinafter, the oncoming vehicles RV1 and RV2 as the mobile objects 3 may be simply referred to as "oncoming vehicle RV1" and "oncoming vehicle RV2", respectively.

FIG. 3(b) shows a determination result that the oncoming vehicle RV1 has no possibility of collision and the oncoming vehicle RV2 has a possibility of collision; the determination being made by the right/left turn determination means 12, the right/left turn point prediction means 13 and the collision determination means 14.

In FIGS. 3(a) and 3(b), the dashed arrows attached to the host vehicle HV, the oncoming vehicles RV1 and RV2 indicate their moving directions. A triangle attached to the front right side of the body of the host vehicle HV indicates that the right blinker is on.

First, in FIG. 3(a), in order to make a right turn, the driver of the host vehicle HV turns on the right blinker and starts deceleration. At this time, the host vehicle information acquisition means 10 acquires the host vehicle information including the speed information, the acceleration information, the blinker information, the direction information, and the like from the in-vehicle sensor equipment 2. Then, the external device communication means 11 acquires the mobile object information from the oncoming vehicles RV1 and RV2.

Next, in FIG. 3(b), on the basis of the host vehicle information, the right/left turn determination means 12 determines the turning-on of the right blinker from the blinker information and the deceleration from the acceleration information, and determines that the host vehicle HV will turn right.

Then, on the basis of the host vehicle information, the right/left turn point prediction means 13 computes from the speed information a distance required for the host vehicle to decelerate its speed (current speed) to the target speed, thereby calculating a right turn prediction point PP. For example, if the speed (current speed) of the host vehicle HV is 60 km/h, the target speed is 30 km/h, and the deceleration is 0.25 G (G indicates a gravitational acceleration), the required distance for deceleration is about 42.5 m.

Then, the collision determination means 14 determines whether or not the host vehicle HV collides with the oncoming vehicles RV1 and RV2. Specifically, the collision determination means 14 determines, on the basis of the host vehicle information and the mobile object information, whether or not the oncoming vehicles RV1 and RV2 are vehicles approaching the host vehicle HV in the right lane of the host vehicle HV. Then, the collision determination means 14 calculates a relative distance between the host vehicle HV and the oncoming vehicle RV1, and a relative distance between the host vehicle HV and the oncoming vehicle RV2.

The collision determination means 14 determines the possibility of collision by comparing the relative distance between the host vehicle HV and the prediction point calculated by right/left turn point prediction means 13 with the relative distance between the host vehicle HV and the oncoming vehicle RV1, and by comparing the relative distance between the host vehicle HV and the prediction point calculated by right/left turn point prediction means 13 with the relative distance between the host vehicle HV and the oncoming vehicle RV2. Here, it is assumed that the collision determination is performed simply by comparing the relative distances. As a result of the determination, it is determined that the oncoming vehicle RV1 has no possibility of collision because it is closer than the prediction point. On the other hand, it is determined that the oncoming vehicle RV2 has a possibility of collision because it is farther than the prediction point. The results of these determinations are shown in FIG. 3(b) using balloons.

Finally, the driving assistance means 15 provides the driver with driving assistance regarding the approach of the oncoming vehicle RV2, which is determined that it has the possibility of collision by the collision determination means 14.

Next, an operation example when the mobile object 3 is a pedestrian will be described.

Figure 4:
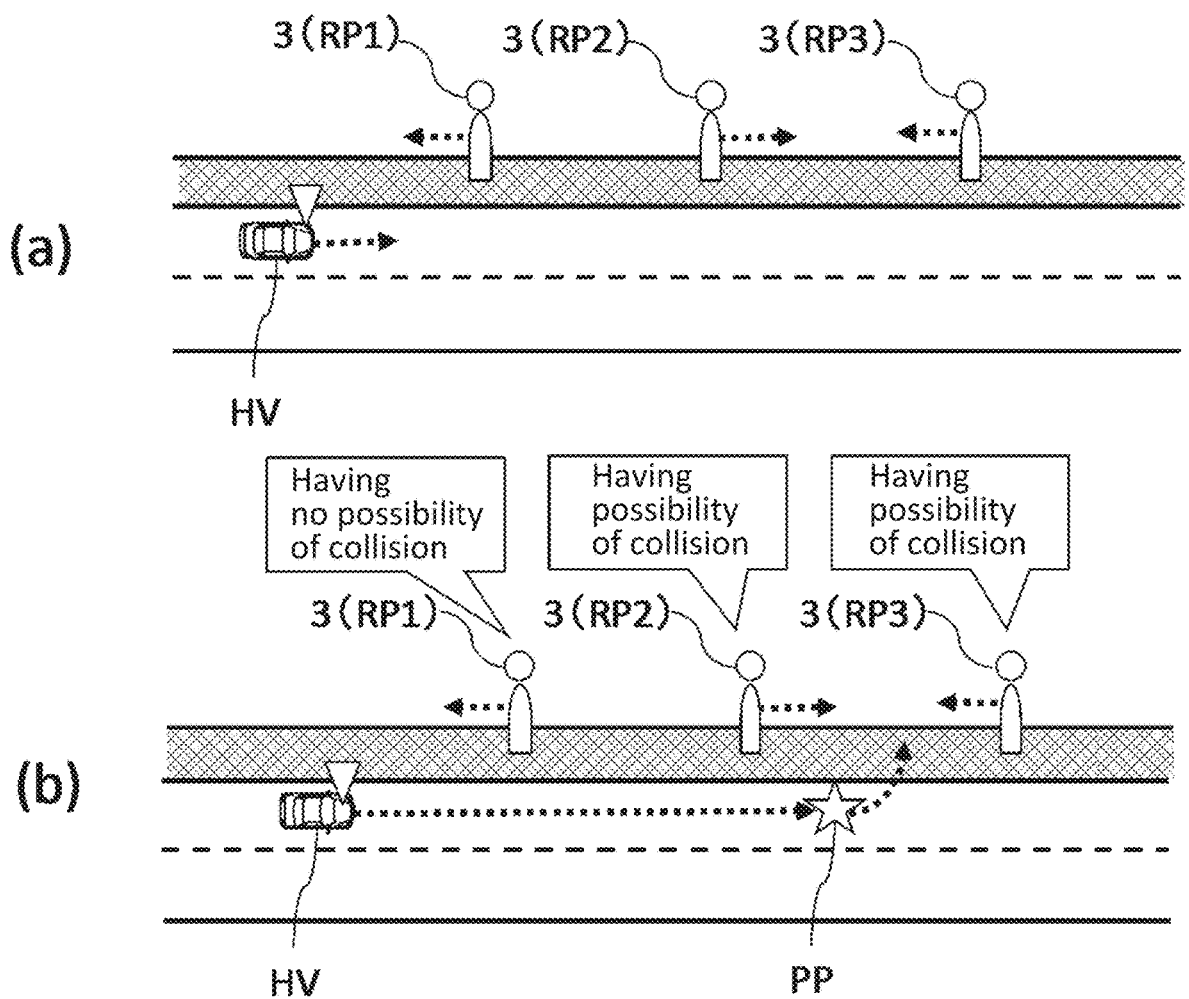
FIG. 4 is a diagram showing an example of the operation of the driving assistance device according to Embodiment 1 of the disclosure.

FIG. 4 is a diagram showing another example of the operation of the driving assistance device 1 according to Embodiment 1 of the disclosure. FIG. 4 shows a specific example of the operation of the driving assistance device 1 that assists in avoiding a collision with a pedestrian in regions where vehicles run on the left side. FIG. 4 is basically based on a composition viewed from above in the same manner as in FIG. 3, but pedestrians are illustrated with their side views so that it is easy to understand that they are pedestrians.

FIG. 4(a) shows that the host vehicle HV will make a left turn on the road and that the pedestrians RP1, RP2, and RP3, which are the mobile objects 3, pass on the adjacent sidewalk on the left side of the road on which the host vehicle HV runs. Note that reference symbols RP1, RP2, and RP3 are shown in parentheses in FIGS. 4(a) and 4(b). In each of FIG. 4(a) and FIG. 4(b), the sidewalk is represented by a hatched area using diagonal lines from upper right to lower left and diagonal lines from upper left to lower right. A triangle attached to the front left side of the body of the host vehicle HV indicates that the blinker is on.

Hereinafter, the pedestrians RP1, RP2, and RP3 that are the mobile objects 3 may be simply referred to as "pedestrian RP1", "pedestrian RP2", and "pedestrian RP3", respectively.

FIG. 4(b) shows a determination result that the pedestrian RP1 has no possibility of collision and the pedestrian RP2 and RP3 have a possibility of collision; the determination being made by the right/left turn determination means 12, the right/left turn point prediction means 13 and the collision determination means 14.

In FIGS. 4 (a) and 4 (b), the dashed arrows attached to the host vehicle HV and the pedestrians RP1, RP2, and RP3 indicate their moving directions.

First, In FIG. 4(a), in order to make a left turn, the driver of the host vehicle HV turns on the left blinker and starts deceleration. At this time, the host vehicle information acquisition means 10 acquires the host vehicle information including the speed information, the acceleration information, the blinker information, the direction information, and the like from the in-vehicle sensor equipment 2. In addition, the external device communication means 11 acquires the mobile object information from the pedestrians RP1, RP2, and RP3.

Next, in FIG. 4(b), on the basis of the host vehicle information, the right/left turn determination means 12 determines the turning-on of the left blinker from the blinker information and the deceleration from the acceleration information, and determines that the host vehicle HV will turn left.

Then, the right/left turn point prediction means 13 calculates, on the basis of the host vehicle information, the distance required to decelerate to the target speed from the speed information, and calculates a left turn prediction point PP on the basis of the position information of the host vehicle information.

Then, the collision determination means 14 determines whether or not the host vehicle HV collides with the pedestrians RP1, RP2, and RP3. Specifically, the collision determination means 14 determines, on the basis of the host vehicle information and the mobile object information, whether the pedestrians RP1, RP2, and RP3 are pedestrians passing on the left side of the host vehicle. Next, the collision determination means 14 determines whether or not the pedestrians RP1, RP2, and RP3 are approaching the left turn prediction point PP calculated by the right/left turn point prediction means 13. As a result of the determination, because the pedestrian RP1 is traveling in the direction away from the prediction point, it is determined that there is no possibility of collision. On the other hand, because the pedestrian RP2 and the pedestrian RP3 are travelling in the direction approaching the prediction point, it is determined that there is a possibility of collision. The results of these determinations are shown in FIG. 4(*b*) using balloons.

Finally, the driving assistance means 15 provides the driver with information about the presence of the pedestrians RP2 and RP3, each of which is determined that it has a possibility of collision by the collision determination means 14, and performs driving assistance.

The above-described operation examples using FIGS. 3 and 4 are examples for regions where vehicles run on the left side; however, even for regions where vehicles run on the right side, the same operation can be realized by switching right turn and left turn.

As described above, according to the present embodiment, the driving assistance device 1 determines a right turn or a left turn of the host vehicle HV and predicts a point of the right turn or the left turn of the host vehicle HV; this enables performing the driving assistance regarding the right or left turn without using road map information including intersection positions or the like.

In addition, even for a distant mobile object that has been conventionally determined that it has no possibility of collision, a correct collision determination can be performed by the driving assistance device 1 predicting a right or left turn point of the host vehicle HV; this enables providing appropriate driving assistance to the driver in advance.

Also, determination of a right or left turn of the host vehicle HV from the speed information, the acceleration information, and the blinker information enables discrimination between a lane change and a right/left turn, and enables collision determination limited to the right/left turn; this enables reduction of unnecessary driving assistance.

Further, by predicting the right turn or left turn point of the host vehicle HV, the mobile object 3 having a possibility of collision at the time of right turn or left turn can be specified, so that unnecessary driving assistance can be reduced.

Further, when predicting the point of turning right or left, the point at which the present speed of the host vehicle HV decreases to the target speed is calculated, so that the point of turning right or left can be predicted correctly even when the host vehicle HV turns right or left without stopping.

Thus, the determination of collision with the mobile object can be correctly performed, thereby reducing the omission of the driving assistance.

Further, by determining that the mobile object approaching the prediction point of the right/left turn has a possibility of collision, not only the determination regarding the oncoming vehicle but also the determination regarding the mobile object such as the pedestrian walking in the same direction are performed without omission; this enables reduction of omission of the driving assistance.

In the present embodiment, the driving assistance means 15 is included in the driving assistance device 1, but the driving assistance means 15 may be provided outside the driving assistance device 1.

Embodiment 2

In the configuration of the disclosure described in Embodiment 1, the deceleration and the target speed used by the right/left turn point prediction means 13 of the driving assistance device 1 to predict the right/left turn point are values unique to the driving assistance device 1.

In the configuration of the disclosure to be described in the present embodiment, the deceleration and the target speed used by the right/left turn point prediction means 13 to predict the right/left turn point are not only fixed values but also values specified by the user or values dynamically changed in the driving assistance device.

Figure 5:
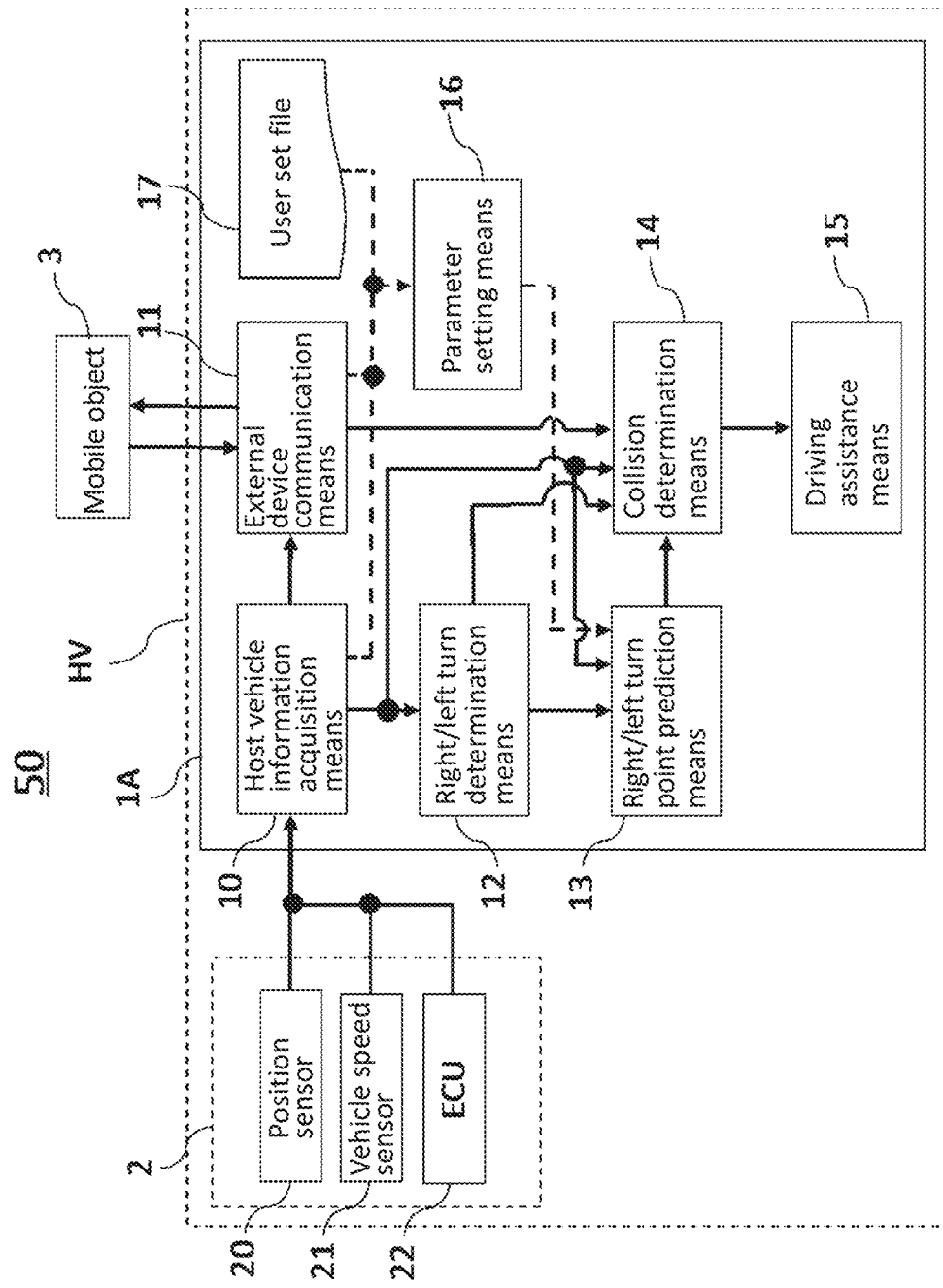
FIG. 5 is a block diagram showing a configuration of a driving assistance device according to Embodiment 2 of the disclosure.

FIG. 5 is a block diagram showing a configuration of a driving assistance device 1A according to Embodiment 2 of the disclosure.

As shown in FIG. 5, the driving assistance device 1A is the same as the driving assistance device 1 shown in FIG. 1 according to Embodiment 1 except that a parameter setting means 16 and a user set file 17 are added.

In FIG. 5, dashed arrows indicate the flow of processing for setting a target speed and a deceleration for the right/left turn point prediction means 13 by using the parameter setting means 16. The solid arrows in FIG. 5 are the same as those in the driving assistance device 1 in FIG. 1.

In FIG. 5, the same components as those of the driving assistance device 1 shown in FIG. 1 according to Embodiment 1 are denoted by the same reference symbols, and detailed descriptions thereof are omitted.

The parameter setting means 16 is a processing unit that dynamically changes parameters used by the right/left turn point prediction means 13 to predict a right or left turn point of the host vehicle HV, and sets the parameters for the right/left turn point prediction means 13.

The parameter setting means 16 sets parameters on the basis of the host vehicle information provided by the host vehicle information acquisition means 10, the mobile object information obtained through the external device communication means 11, and the user set information held by the user set file 17.

Specifically, the parameter setting means 16 calculates the target speed and the deceleration from the host vehicle information, the mobile object information, and the user set information, and sets them for the right/left turn point prediction means 13.

The setting method of the target speed and the deceleration may be, for example, a method using a value read out from the user set file 17 or a method of determining from the mobile object information sent from one or more mobile objects 3. Alternatively, it may be a method using the acceleration/deceleration of the host vehicle HV in the host vehicle information, or a method of setting from the host vehicle information using machine learning.

It may be a combination of the above-mentioned methods. For example, it may be such a method that the host vehicle information is used when the deceleration is small, and the user set information is used when the deceleration is large.

The user set file 17 is a file for specifying a calculation method and set values of parameters for the prediction, which are set by the user of the driving assistance device 1A such as a driver and calculated by the parameter setting means 16.

The calculation method is, for example, a method using a value specified by the user set file 17, a method using the acceleration/deceleration in the host vehicle information, a method of estimating from one or more mobile object information, or a combination thereof. In the case of combination, according to the deceleration of the host vehicle HV, the fixed value set by the user may be used if the deceleration is smaller than a certain threshold, and the acceleration/deceleration in the host vehicle information may be used if the deceleration is equal to or larger than the certain threshold, for example. In this manner, the target speed and the deceleration can be set according to the acceleration performance of each vehicle. The target speed and the deceleration may also be set according to the driving characteristics of each driver, so that the right or left turn point can be predicted according to the right/left turn speed of each driver.

As described above, in the driving assistance device 1A, the target speed and the deceleration used for predicting the right turn or the left turn point can be set in the right/left turn point prediction means 13 and can be changed in the host vehicle HV.

In the present embodiment, the flow of the driving assistance processing in the driving assistance device 1A is indicated by the solid arrows in FIG. 5 as described above. This is the same as the processing flow of the driving assistance device 1 according to Embodiment 1.

Thus, according to the present embodiment, effects similar to those of Embodiment 1 can be obtained.

In the present embodiment, the driving assistance device 1A includes the parameter setting means 16. Thus, by setting or changing the target speed and the deceleration, it is possible to predict a right or left turn point according to the acceleration/deceleration performance of each vehicle or the right/left turn speed of each driver. Therefore, it is possible to predict the right/left turn point with high accuracy, and to improve the accuracy of the collision determination.

This reduces unnecessary driving assistance and omission of necessary driving assistance.

Embodiment 3

A driving assistance device 1B according to Embodiment 3 of the present disclosure will be described below referring to the drawings.

Similarly to Embodiments 1 and 2, the driving assistance device 1B in the present embodiment is mainly assumed to be an in-vehicle device, and a case will be described in which it provides services as a driving assistance device of the driving assistance system 50.

Figure 6:
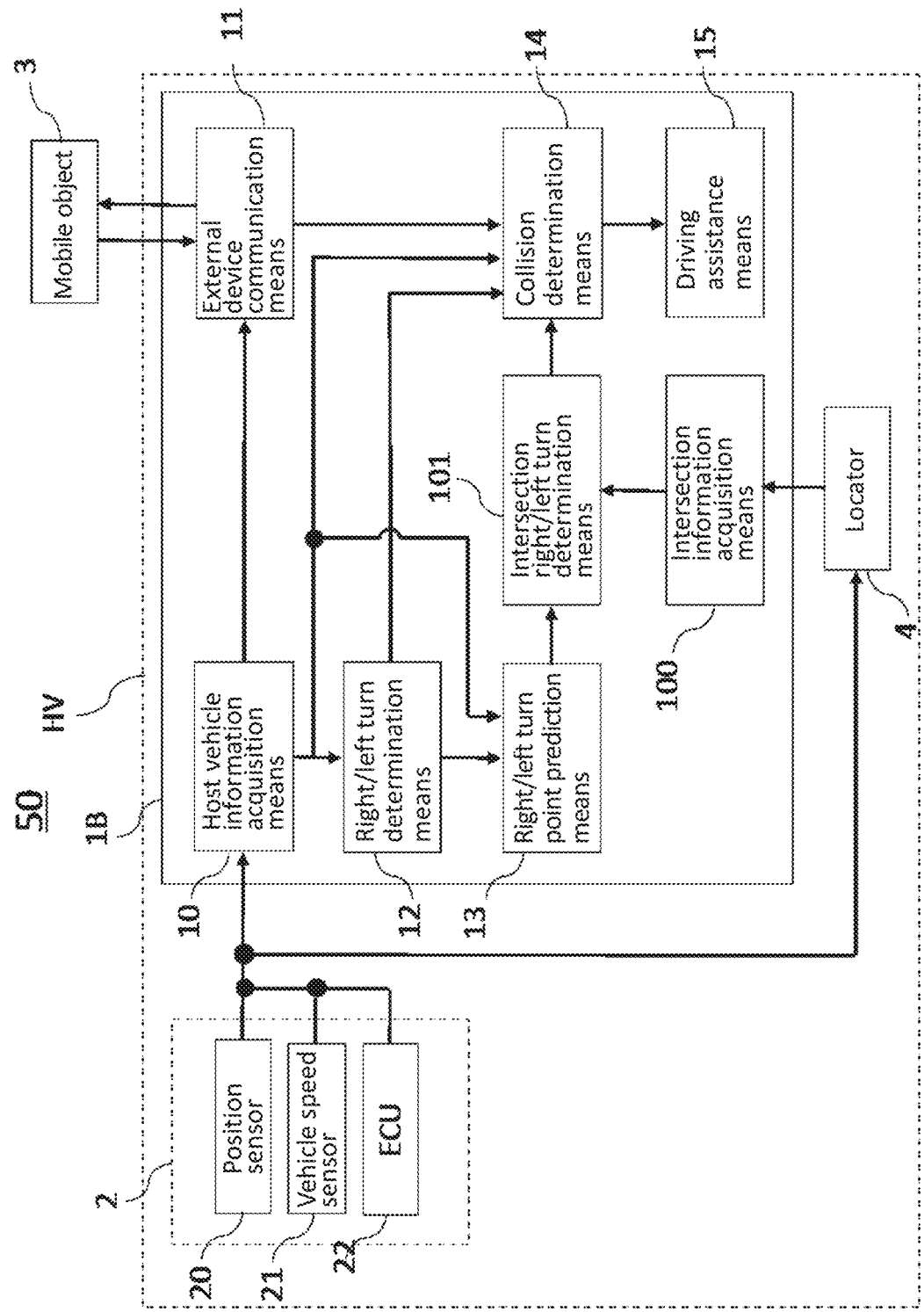
FIG. 6 is a block diagram showing a configuration of a driving assistance device according to Embodiment 3 of the disclosure.

FIG. 6 is a block diagram illustrating a configuration of the driving assistance device 1B according to Embodiment 3 of the present disclosure.

The driving assistance system 50 in FIG. 6 is a system that provides driving assistance to a driver when road map information including intersection information can be used.

The driving assistance system 50 according to the present embodiment has the same configuration as driving assistance system 50 according to Embodiment 1 except that the driving assistance device 1 is replaced by the driving assistance device 1B and a locator 4 is added.

Here, the road map information is information having relations regarding the positions and connections of roads. The road map information is represented by a road link format, for example, and includes information about a link shape, positions of link start points and link end points, road types, and connections with other road links.

The intersection information is information about an intersection on a road included in the road map information, and includes the position of the intersection, the size of the intersection, and road links for entering or exiting the intersection, for example.

The position of the intersection may be the center position of the intersection, may be a position where roads (two representative roads, if there are three or more roads) for entering and exiting the intersection intersect, or may be an area of the intersection.

The locator 4 is a device that stores the road map information, and calculates the current position of the host vehicle HV on the road map information on the basis of the vehicle information, which is generated by the in-vehicle sensor equipment 2 and indicates the vehicle state and running state of the host vehicle HV.

The locator 4 provides the driving assistance device 1B with the intersection information about a nearby intersection that is located in the traveling direction of the host vehicle HV from its current position, the intersection being referred to as a nearby-intersection, hereinafter. The locator 4 may provide one piece or plural pieces of intersection information.

The nearby-intersection is an intersection that is located in the reach of wireless communications or in the distribution area of mobile object information set by the wireless communication system.

The locator 4 may be included in the driving assistance device 1B, or may be connected to the driving assistance device 1B directly or via an in-vehicle network.

The driving assistance device 1B is an in-vehicle communication information processing device that provides driving assistance to the driver of the host vehicle HV, and performs the following. The driving assistance device 1B receives the mobile object information generated by the mobile object 3 by wireless communication, predicts the right/left turn point of the host vehicle HV, and determines a collision between the host vehicle HV and the mobile object 3 using the intersection information provided by the locator 4. The driving assistance device 1B provides driving assistance to the driver of the host vehicle HV on the basis of the determination result of the collision.

The driving assistance device 1B has the same configuration as the driving assistance device 1 according to Embodiment 1 except that an intersection information acquisition means 100 and an intersection right/left turn determination means 101 are added.

The intersection information acquisition means 100 is a processing unit that acquires map information including intersection information about nearby-intersections provided by the locator 4, and provides the map information to the intersection right/left turn determination means 101.

The intersection information acquisition means 100 may request the locator 4 to send information about nearby-intersections, or may acquire information about nearby-intersections that the locator 4 periodically sends.

The intersection right/left turn determination means 101 is a processing unit that determines the right/left turn point of the host vehicle HV, updates the prediction point of right/left turn at the intersection, and provides the updated prediction point to the collision determination means 14. The intersection right/left turn determination means 101 determines the right/left turn point of the host vehicle HV on the basis of the prediction point generated by the right/left turn point prediction means 13 and the intersection information provided by the intersection information acquisition means 100.

Regarding the right/left turn (right turn or left turn) of the host vehicle HV, the intersection right/left turn determination means 101 determines whether the host vehicle HV makes a right/left turn in the intersection or outside the intersection. The right/left turn in the intersection is, for example, a right/left turn at a place, such as a public road intersection, whose intersection information is in the road map information. The right/left turn outside the intersection is, for example, a right/left turn at a place whose intersection information is not in the road map information, which includes a case of entering a place that is not an intersection, such as a private parking lot and a case of entering a private road connecting to the intersection.

The determination of the right/left turn point of the host vehicle HV is made by determining whether the prediction point is in the intersection surrounding area preset for the intersection on the basis of the prediction point predicted by the right/left turn point prediction means 13 and the position included in the intersection information provided by the intersection information acquisition means 100.

When the prediction point is within the intersection surrounding area, the intersection right/left turn determination means 101 determines that the host vehicle HV makes a right or left turn in the intersection, replaces the prediction point with the position of the intersection, and provides it to the collision determination means 14. On the other hand, when the prediction point is outside the intersection surrounding area, the intersection right/left turn determination means 101 determines that the host vehicle HV makes a right/left turn outside the intersection and provides the prediction point without being updated to the collision determination means 14.

Note that if there is no intersection information to be acquired by the intersection information acquisition means 100, it is determined that the vehicle makes a right/left turn outside the intersection, and the prediction point is provided without being updated to the collision determination means 14.

The intersection surrounding area may be specified with a format that can represents the positional relation between the intersection and the host vehicle HV and the positional relation between the intersection and the mobile object 3. The format includes a format specifying a distance from an intersection center, a format specifying coordinates such as latitude and longitude, a format specifying an area such as a rectangle area, and a format specifying an arrival time from the current position to the intersection center. The format specifying a rectangle area includes a format using coordinates of four corners of the rectangle for specification.

The intersection surrounding area may be specified by set values based on preset fixed values, may be specified on the basis of the intersection information, or may be specified by setting values determined by the intersection right/left turn determination means 101 on the basis of the intersection information.

When the intersection surrounding area is specified by distances from the intersection center, the area is defined as a rectangular area having two sides parallel to the center line of the road on which the host vehicle HV runs, the intersection center being the area's center of gravity and the length of the two parallel sides being twice the distance from the intersection center. The width of the rectangular area, that is, the distance between the two parallel sides is a distance covering the road on which the vehicle HV runs. The width of the rectangular area may be larger than the width of the road on which the host vehicle HV runs.

Figure 7:
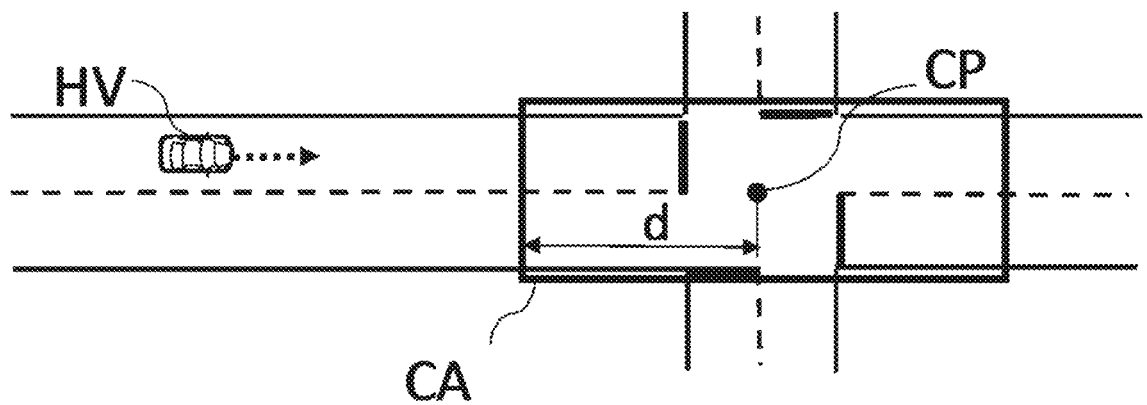
FIG. 7 is a diagram showing an intersection surrounding area according to Embodiment 3 of the disclosure.

FIG. 7 shows an example of setting the intersection surrounding area. FIG. 7 is an illustration showing an example of setting the intersection surrounding area CA in a case where the distance from an intersection center CP is specified and in a case where the host vehicle HV is about to enter the intersection whose intersection center is indicated by the symbol CP. In the illustration, a predetermined distance d (50 m in the above example) is given as the distance from the intersection center CP. As described above, in the intersection surrounding area CA, the lengths of two sides parallel to the center line of the road on which the vehicle HV runs are each 2d, and the lengths of the other two sides perpendicular to said two sides are each equal to or longer than the width of the road on which the vehicle HV runs. The center of gravity of the rectangular area indicating the intersection surrounding area CA matches with the intersection center CP. In this manner, when the predetermined distance d is specified as the distance from the intersection center CP, the intersection surrounding area CA is set.

For some shapes of roads for entering or exiting the intersection, the setting using a rectangular area is not optimal. One example is a case where, near the intersection, the center line of the road on which the host vehicle HV runs is, for example, not straight but curved; here, "near the intersection" means "in a range of the predetermined distance d from the intersection center CP", for example. In this case, on the basis of the road link shape data included in the road map information provided from the locator 4, the intersection surrounding area CA may be set as an area including a road portion whose length measured along the road link from the intersection center is equal to or shorter than a predetermined distance d. Here, the width of the intersection surrounding area CA, that is, the width measured in the direction perpendicular to the road link, is equal to or larger than the road width.

Also, in a case where the road on which the host vehicle HV travels changes its direction from that before the host vehicle HV enters the intersection when the host vehicle HV exits the intersection, the similar setting can be made as the case where the center line of the road curves near the intersection.

Returning to FIG. 6, the description of the configuration of the driving assistance device 1B will be continued.

As an example, a description will be given of a case where the distance from the intersection center CP is specified and the intersection surrounding area CA is set with the rectangular area by the above-described method. Here, the intersection right/left turn determination means 101 determines that the host vehicle HV makes a right or left turn in the intersection if the turning point predicted by the right/left turn point prediction means 13 is within a predetermined distance (e.g. 50 m) from the intersection center (or in the intersection surrounding area). The intersection right/left turn determination means 101 determines that the host vehicle HV makes a right/left turn outside the intersection if the predicted right/left turn point is outside the intersection surrounding area CA.

Next, the operation of the driving assistance device 1B according to the present embodiment will be described.

Figure 8:
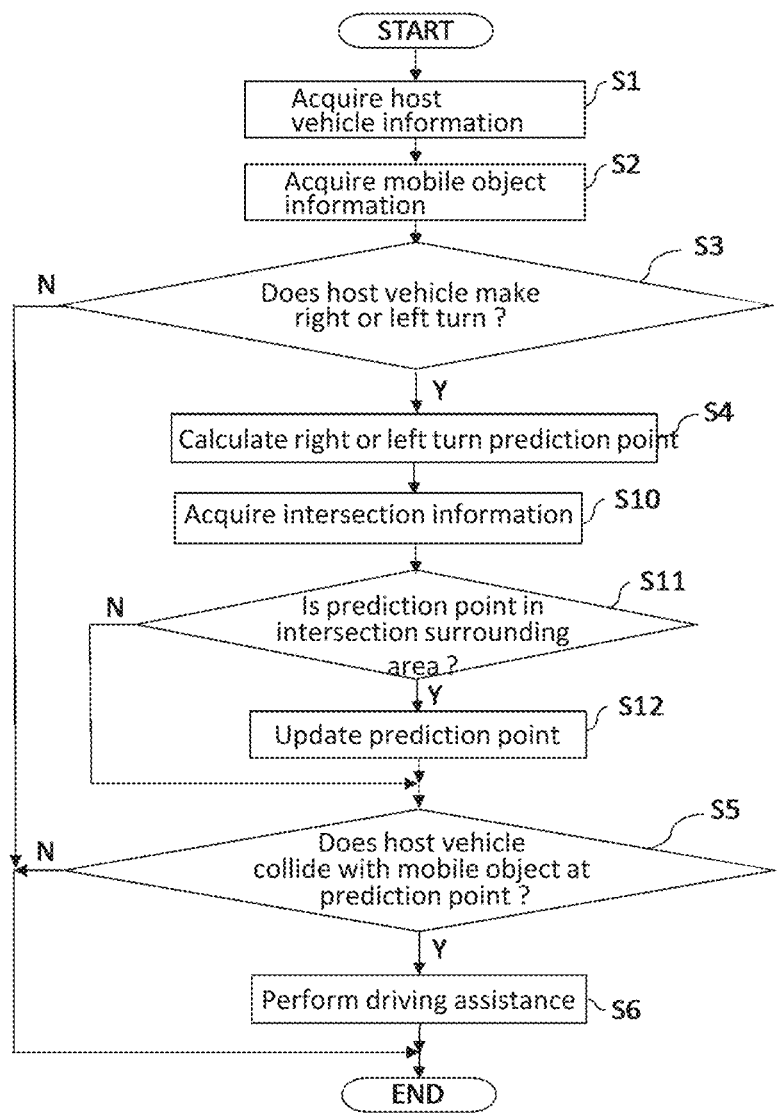
FIG. 8 is a flowchart showing an operation of the driving assistance device according to Embodiment 3 of the disclosure.

FIG. 8 is an example of a flowchart showing the operation of means constituting the driving assistance device 1B in the present embodiment.

As shown in FIG. 8, in the driving assistance device 1B of the present embodiment, operation steps of Steps S10, S11, and S12 are added between Step S4 and Step S5 of the operation of the driving assistance device 1 of Embodiment 1 shown in FIG. 2.

The processing from Step S1 to Step S4 in FIG. 8 is the same as the processing from Step S1 to S4 in FIG. 2. These steps are denoted by the same reference symbols, and detailed descriptions thereof are omitted.

After the right/left turn point prediction means 13 predicts a right or left turn point in Step S4 in FIG. 8, the processing proceeds to Step S10.

In Step S10, the intersection information acquisition means 100 acquires information about an intersection present ahead (in the traveling direction) of the host vehicle HV. After the intersection information is acquired, the processing proceeds to Step S11.

In Step S11, the intersection right/left turn determination means 101 determines whether or not the right or left turn prediction point predicted in Step S4 is within the intersection surrounding area CA (or in the intersection surrounding area) for the intersection information acquired in Step S10. If the right or left turn prediction point is in the intersection surrounding area, the processing proceeds to Step S12. In the case where there are plural pieces of intersection information, if it is determined that the right or left turn point is in the intersection surrounding area for one of the plural pieces of intersection information, the processing proceeds to Step S12. Otherwise, that is, if the right or left turn prediction point is not in any of the intersection surrounding areas, the processing proceeds to Step S5.

In Step S12, the intersection right/left turn determination means 101 updates the right or left turn prediction point on the basis of the intersection information of the intersection determined that it is in the intersection surrounding area in Step S11. After the update is completed, the processing proceeds to Step S5.

Hereinafter, the processes from Steps S5 to S6 are the same as the processes from Steps S5 to S6 in FIG. 2 of Embodiment 1, and the same reference symbols are given and the detailed descriptions thereof are omitted.

During the operation, the driving assistance device 1B repeatedly executes the processing described above referring to FIG. 8.

Next, an operation example of the driving assistance device 1B according to the present embodiment will be described referring to FIG. 9.

Figure 9:
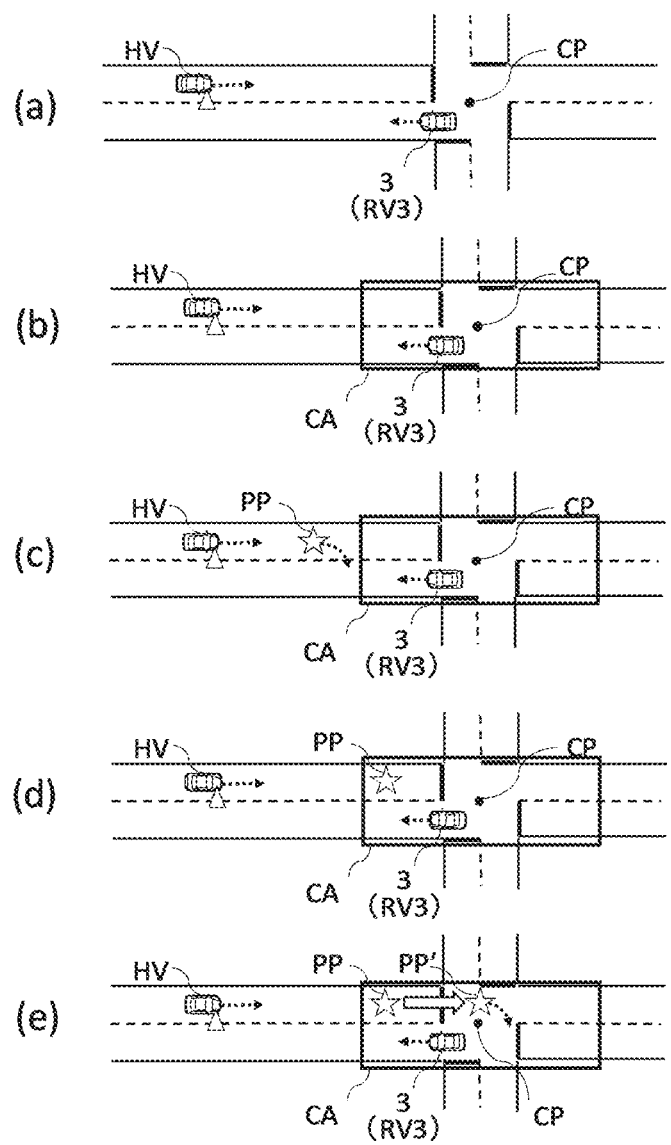
FIG. 9 is a diagram showing examples of the operation of the driving assistance device according to Embodiment 3 of the disclosure.

FIG. 9 is a diagram showing an example of the operation of the driving assistance device 1B according to Embodiment 3 of the disclosure. FIG. 9 shows an example for regions where vehicles run on the left side FIG. 9 shows bird's-eye views from above, similar to FIG. 3.

FIG. 9(a) illustrates a case where an intersection with its intersection center CP is ahead of the host vehicle HV and an oncoming vehicle RV3 that is a mobile object 3 approaches the host vehicle HV when the host vehicle HV turns right.

FIG. 9(b) is a diagram showing an intersection surrounding area CA set around the intersection in the case of FIG. 9(a).

FIG. 9(c) illustrates the way in which the host vehicle HV is predicted to make a right turn at the prediction point PP and is determined that it makes the right turn outside the intersection surrounding area CA.

FIG. 9(d) illustrates the way in which the host vehicle HV is predicted to make a right turn at the prediction point PP and is determined that it makes the right turn in the intersection surrounding area CA.

FIG. 9(e) illustrates the way in which the prediction point PP is updated when it is determined that a right turn is made in the intersection.

In FIGS. 9(b) to (e), the intersection surrounding area CA is represented by a rectangular area. However, the intersection surrounding area CA is not always specified by a rectangular area.

Hereinafter, the oncoming vehicle RV3 that is a mobile object 3 may be simply represented as "oncoming vehicle RV3".

A case where a right turn is made outside the intersection will be described referring to FIGS. 9 (a) and 9 (c).

In FIG. 9(a), in order to make a right turn, the host vehicle HV turns on the right blinker while running and starts deceleration. At this time, the right/left turn determination means 12 determines a right turn of the host vehicle HV, and the right/left turn point prediction means 13 calculates a right turn prediction point PP.

In FIG. 9(c), the intersection right/left turn determination means 101 determines that the prediction point PP (indicated by a star in FIG. 9(c)), which is predicted by the right/left turn point prediction means 13, is outside the intersection surrounding area CA. Thus, the intersection right/left turn determination means 101 determines that the host vehicle HV makes a right turn outside the intersection (outside the intersection surrounding area CA), and provides the prediction point PP without being updated to the collision determination means 14. The collision determination means 14 determines that there is a possibility of collision with the oncoming vehicle RV3 because the oncoming vehicle RV3 runs in a direction of approaching the prediction point PP. The driving assistance means 15 provides driving assistance based on the oncoming vehicle RV3 to the driver of the host vehicle HV.

Next, using FIG. 9(a), FIG. 9(d), and FIG. 9(e), a case where a right turn is made inside the intersection will be described.

In FIG. 9(a), similarly to the above-described case of making the right turn outside the intersection, the right/left turn determination means 12 determines a right turn of the host vehicle HV from the behavior of the right turn by the host vehicle HV.

In FIG. 9(d), the right/left turn point prediction means 13 obtains a right turning prediction point PP. The intersection right/left turn determination means 101 determines that the prediction point PP predicted by the right/left turn point prediction means 13 is within the intersection surrounding area CA, thereby determining that host vehicle HV turns right in the intersection.

In FIG. 9(e), using the position information included in the intersection information, the intersection right/left turn determination means 101 replaces the prediction point PP with the position of the intersection to generate a prediction point PP', and provides the prediction point PP' to the collision determination means 14. The prediction point PP' is the accurate prediction point when the right turn is made in the intersection. That is, the prediction point PP' is a right turn prediction point corrected on the basis of the intersection information. The collision determination means 14 determines that there is no possibility of collision with the oncoming vehicle RV3 that is another mobile object 3 because the oncoming vehicle RV3 runs in a direction away from the prediction point PP'. The driving assistance means 15 does not provide driving assistance because it is determined that there is no possibility of collision with the oncoming vehicle RV3.

The above-described operation example using FIG. 9 is an example for regions where vehicles run on the left side; however, even for regions where vehicles run on the right side, the same operation can be realized by switching right turn and left turn.

As described above, according to the present embodiment, the driving assistance device capable of acquiring a road map determines a right/left turn point on the basis of a right/left turn prediction point and an intersection position; thus, for an intersection whose map information is available, collision determination with a mobile object can be made with high accuracy using the map information. Also, even for a place for which map information is not available, correct collision determination can be made. This enables providing driving assistance without omission.

In addition, an intersection surrounding area indicating the intersection with its surroundings is defined, and when the right/left turn prediction point is in the intersection surrounding area, it is determined that the right/left turn will be made inside the intersection. As a result, collision determination using the intersection information can be performed, so that it is possible to correctly determine collision with another mobile object.

Figure 10:
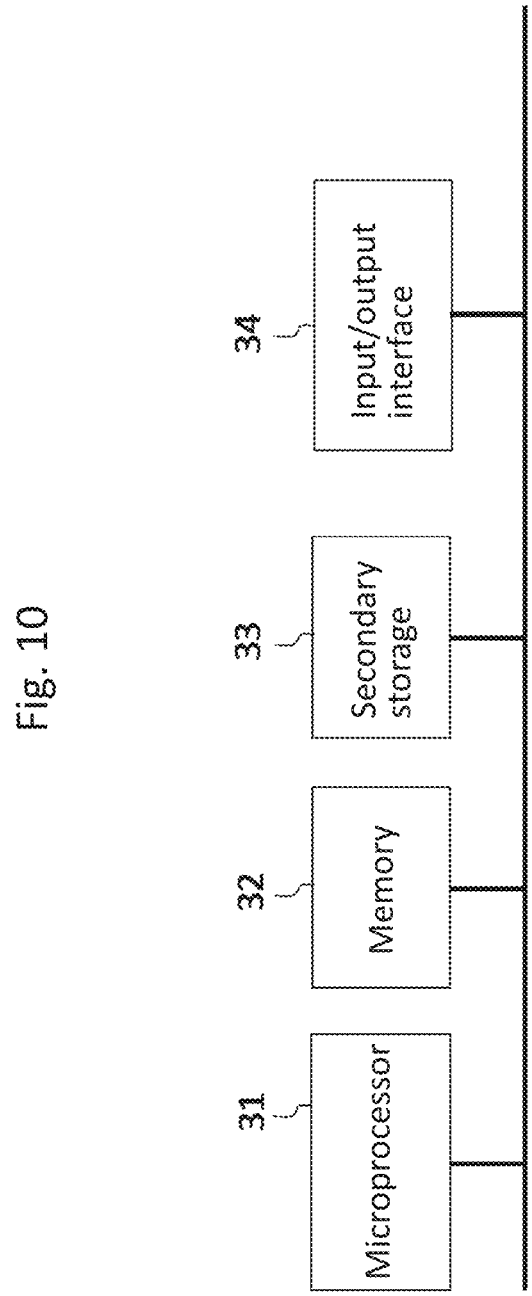
FIG. 10 is a diagram showing a hardware configuration example of the driving assistance devices according to Embodiments 1 to 3 of the disclosure.

The driving assistance devices 1, 1A, and 1B in Embodiments 1 to 3 described above can be implemented using the hardware configuration shown in FIG. 10, for example. As shown in FIG. 10, a microprocessor 31, a memory 32, a secondary storage 33, and an input/output interface 34 are provided, and they cooperate to realize the driving assistance devices 1, 1A, and 1B according to Embodiments 1 to 3.

That is, programs of the driving assistance device 1, 1A or 1B realized as software are stored in the secondary storage 33 in advance; the programs are read out from the secondary storage 33 into the memory 32 to be executed by the microprocessor 31. The driving assistance provided by the driving assistance means 15 to the driver is realized by controlling HMI equipment (not shown) connected via the input/output interface 34 shown in FIG. 10. Alternatively, by controlling vehicle control equipment (not shown) connected via the input/output interface 34, the driving assistance such as automatic braking and start prevention is provided.

The above-described realizing method as software is merely an example, and the method of realizing the driving assistance device 1 1A, or 1B is not limited thereto. For example, the driving assistance device 1, 1A, 1B may be realized as hardware using a dedicated circuit. Also, a part of the configuration of the driving assistance device 1, 1A, 1B may be realized by hardware using a dedicated circuit, and the other part may be realized by software.

For the present disclosure, the embodiments can be modified and omitted accordingly within the scope of the present disclosure.

LIST OF REFERENCE SYMBOLS 1, 1A, 1B driving assistance device
3 around-host-vehicle mobile object (mobile object)
10 host vehicle information acquisition means
11 external device communication means
12 right/left turn determination means
13 right/left turn point prediction means
14 collision determination means
15 driving assistance means
16 parameter setting means
100 intersection information acquisition means
101 intersection right/left turn determination means
HV host vehicle

The invention claimed is:

1. A driving assistance device comprising:
processing circuitry
to acquire host vehicle information that is vehicle information of a host vehicle,
to receive mobile object information from a mobile object outside the host vehicle using wireless communication,
to predict whether the host vehicle will make a right turn or a left turn on a basis of the host vehicle information,
to obtain a prediction point at which the host vehicle is predicted to make the right turn or the left turn by calculating a right turn point or a left turn point of the host vehicle on a basis of the host vehicle information,
to determine if the prediction point is within a surrounding area of an intersection,
to update the prediction point to be at a location of the intersection, only if the prediction point is determined to be within the surrounding area of the intersection,
to determine whether or not the host vehicle collides with the mobile object using the host vehicle information, the mobile object information, and the prediction point, and
to perform driving assistance of the host vehicle on a basis of a result of the collision determination, the driving assistance including at least one of screen display, sound output, vibration, and activation of automatic braking of the host vehicle, wherein
the processing circuitry obtains the prediction point by calculating, on a basis of a preset deceleration, a distance required for the speed of the host vehicle included in the host vehicle information to reach a target speed set in advance,
the processing circuitry determines a running state of the host vehicle from speed information and acceleration information included in the host vehicle information, and
the processing circuitry distinguishes between a right/left turn of the host vehicle and a lane change of the host vehicle based on the determined running state of the host vehicle.

2. The driving assistance device according to claim 1, wherein
the processing circuitry
sets a parameter to be used to calculate the prediction point, and
sets the deceleration and the target speed using the host vehicle information, the mobile object information, and information set by a user, and
calculates the prediction point based, in part, on the parameter.

3. The driving assistance device according to claim 1, wherein the processing circuitry determines which one of the right turn and the left turn is a behavior of the host vehicle using speed information, acceleration information and blinker information included in the host vehicle information.

4. The driving assistance device according to claim 2, wherein the processing circuitry determines which one of the right turn and the left turn is a behavior of the host vehicle using speed information, acceleration information and blinker information included in the host vehicle information.

5. The driving assistance device according to claim 1, wherein the processing circuitry determines, on a basis of the prediction point and the mobile object information, the mobile object approaching the prediction point as the mobile object having a possibility of collision.

6. The driving assistance device according to claim 2, wherein the processing circuitry determines, on a basis of the prediction point and the mobile object information, the mobile object approaching the prediction point as the mobile object having a possibility of collision.

7. The driving assistance device according to claim 2, wherein the information set by the user is retrieved from a user set file set by a driver of the host vehicle.

8. The driving assistance device according to claim 1, further comprising:
a locator that stores road map information and calculates a current position of the host vehicle on a road map based on the host vehicle information, wherein
the processing circuitry is further configured to determine the right turn or the left turn of the host vehicle when the current position of the vehicle is calculated to be a location that is not included in the stored road map information.

9. The driving assistance device according to claim 1, wherein
the location of the intersection is obtained from stored road map information, and
the surrounding area of the intersection is an area including a road portion having a length equal to or shorter than a predetermined distance from the intersection.

10. The driving assistance device according to claim 1, wherein
the processing circuitry is further configured to determine whether the host vehicle collides with the mobile object when the prediction point is determined to be outside the surrounding area of the intersection.

11. A driving assistance method comprising:
acquiring host vehicle information that is vehicle information of a host vehicle;
receiving mobile object information from a mobile object outside the host vehicle using wireless communication;
predicting whether the host vehicle will make a right turn or a left turn on a basis of the host vehicle information;
obtaining a prediction point at which the host vehicle is predicted to make the right turn or the left turn by calculating a right turn point or a left turn point of the host vehicle on a basis of the host vehicle information;
determining if the prediction point is within a surrounding area of an intersection,
updating the prediction point to be at a location of the intersection, only if the prediction point is determined to be within the surrounding area of the intersection,
determining whether or not the host vehicle collides with the mobile object using the host vehicle information, the mobile object information, and the prediction point;
performing driving assistance of the host vehicle on a basis of a result of the collision determination, the driving assistance including at least one of screen display, sound output, vibration, and activation of automatic braking of the host vehicle;
obtaining the prediction point by calculating, on a basis of a preset deceleration, a distance required for the speed of the host vehicle included in the host vehicle information to reach a target speed set in advance;
determining a running state of the host vehicle from speed information and acceleration information included in the host vehicle information; and
distinguishing between a right/left turn of the host vehicle and a lane change of the host vehicle based on the determined running state of the host vehicle.

12. A non-transitory computer readable medium storing computer instructions that when executed by a computer cause the computer to perform a driving assistance method comprising:
acquiring host vehicle information that is vehicle information of a host vehicle;
receiving mobile object information from a mobile object outside the host vehicle using wireless communication;
predicting whether the host vehicle will make a right turn or a left turn on a basis of the host vehicle information;
obtaining a prediction point at which the host vehicle is predicted to make the right turn or the left turn by calculating a right turn point or a left turn point of the host vehicle on a basis of the host vehicle information;
determining if the prediction point is within a surrounding area of an intersection;
updating the prediction point to be at a location of the intersection, only if the prediction point is determined to be within the surrounding area of the intersection;
determining whether or not the host vehicle collides with the mobile object using the host vehicle information, the mobile object information, and the prediction point;
performing driving assistance of the host vehicle on a basis of a result of the collision determination, the driving assistance including at least one of screen display, sound output, vibration, and activation of automatic braking of the host vehicle;
obtaining the prediction point by calculating, on a basis of a preset deceleration, a distance required for the speed of the host vehicle included in the host vehicle information to reach a target speed set in advance;
determining a running state of the host vehicle from speed information and acceleration information included in the host vehicle information; and
distinguishing between a right/left turn of the host vehicle and a lane change of the host vehicle based on the determined running state of the host vehicle.

* * * * *